United States Patent
Johansson et al.

(10) Patent No.: US 8,724,497 B2
(45) Date of Patent: May 13, 2014

(54) METHOD OF UPLINK MDT MEASUREMENT

(75) Inventors: Per Johan Mikael Johansson, Kungsangen (SE); Yih-Shen Chen, Hsinchu (TW); Chia-Chun Hsu, Taipei (TW); Michael Roberts, Neuilly sur Seine (FR)

(73) Assignee: Mediatek Inc. (TW)

( * ) Notice: Subject to any disclaimer, the term of this patent is extended or adjusted under 35 U.S.C. 154(b) by 161 days.

(21) Appl. No.: 13/373,070

(22) Filed: Nov. 2, 2011

(65) Prior Publication Data

US 2012/0106386 A1    May 3, 2012

Related U.S. Application Data (60) Provisional application No. 61/409,737, filed on Nov. 3, 2010.

(51) Int. Cl.
*G01R 31/08* (2006.01)

(52) U.S. Cl.
USPC .......................................... 370/252; 370/328

(58) Field of Classification Search
USPC .................................. 370/310–350
See application file for complete search history.

(56) References Cited

U.S. PATENT DOCUMENTS

| | | | | |
|---|---|---|---|---|
| 2005/0124372 A1* | 6/2005 | Lundby et al. | ................ | 455/522 |
| 2005/0201280 A1* | 9/2005 | Lundby et al. | ................ | 370/229 |
| 2007/0111746 A1* | 5/2007 | Anderson | ................ | 455/522 |
| 2009/0175187 A1 | 7/2009 | Jersenius et al. | ................ | 370/252 |
| 2010/0105336 A1* | 4/2010 | Attar et al. | ................ | 455/67.11 |
| 2010/0120446 A1 | 5/2010 | Gaal | ................ | 455/452.2 |
| 2010/0272091 A1 | 10/2010 | Fabien et al. | ................ | 370/345 |
| 2010/0330921 A1 | 12/2010 | Kim et al. | ................ | 455/67.11 |
| 2011/0201279 A1 | 8/2011 | Suzuki et al. | ................ | 455/67.11 |
| 2011/0281525 A1* | 11/2011 | Furuskar et al. | ................ | 455/67.11 |
| 2012/0039365 A1 | 2/2012 | Suzuki et al. | ................ | 375/147 |
| 2012/0064886 A1 | 3/2012 | Kim et al. | ................ | 455/423 |
| 2012/0135736 A1 | 5/2012 | Sebire et al. | ................ | 455/436 |
| 2012/0182879 A1 | 7/2012 | Tamura et al. | ................ | 370/242 |
| 2012/0309404 A1 | 12/2012 | Suzuki et al. | ................ | 455/450 |
| 2012/0315890 A1 | 12/2012 | Suzuki et al. | ................ | 455/422.1 |
| 2013/0095818 A1 | 4/2013 | Levy et al. | ................ | 455/423 |
| 2013/0171986 A1 | 7/2013 | Shimizu | ................ | 455/423 |
| 2013/0178204 A1 | 7/2013 | Zhang et al. | ................ | 455/423 |

FOREIGN PATENT DOCUMENTS

| | | |
|---|---|---|
| JP | 2009011065 A | 1/2009 |
| WO | WO2009011065 A1 | 1/2009 |

OTHER PUBLICATIONS

International Search Report and Written Opinion of International Search Authority for PCT/CN2011/081737, dated Feb. 16, 2012(13 pages).

USPTO, Office Action of related U.S. Appl. No. 13/373,067 dated Sep. 3, 2013 (18 pages).

* cited by examiner

*Primary Examiner* — Bob Phunkulh
(74) *Attorney, Agent, or Firm* — Zheng Jin; Helen Mao (57) ABSTRACT

Methods of MDT information logging and reporting are provided. In one embodiment, a method is provided to resolve shortcomings of prior art by correlating UL measurements with QoS information to enable UL performance analysis and accurate detection of coverage problems. In another embodiment, a method is provided to resolve the shortcomings of the prior art by making DL measurements and location information collecting or logging conditional on UL measurements.

21 Claims, 5 Drawing Sheets

METHOD OF UPLINK MDT MEASUREMENT

CROSS REFERENCE TO RELATED APPLICATIONS

This application claims priority under 35 U.S.C. §119 from U.S. Provisional Application No. 61/409,737, entitled "Method of MDT Information Logging and Reporting," filed on Nov. 3, 2010, the subject matter of which is incorporated herein by reference.

TECHNICAL FIELD

The disclosed embodiments relate generally to Minimization of Drive Test (MDT), and, more particularly, to uplink MDT measurement.

BACKGROUND $3^{rd}$ Generation Partnership Project (3GPP) long term evolution (LTE) system, introduced as 3GPP release 8, is an improved universal mobile telecommunication system (UMTS). An LTE system offers high peak data rates, low latency, improved system capacity, and low operating cost resulting from simple network architecture. In the LTE system, an evolved universal terrestrial radio access network (E-UTRAN) includes a plurality of evolved Node-Bs (eNBs) communicating with a plurality of mobile stations, referred as user equipment (UE).

3GPP introduces Minimization of Drive Test (MDT) to give service provider a cost effective way for coverage optimization. Radio layer coverage in a mobile system may vary depending on a location of a base station, deployment of buildings nearby, interferences during the usage of a mobile user and other environmental factors. Traditionally, service providers need to perform drive test to collect measurement result and location information. The collected information is then used to analyze the coverage. Optimizations are done by adjusting parameters based on the analysis. After each optimization, drive test has to be undertaken again to make sure the impact of the changes on the system is positive. Such tests are very costly. MDT is designed to alleviate the problem by providing a method to use UEs to perform such test. It is beneficial to collect UE measurement results on the field to enable a more efficient network optimization and it is feasible to acquire measurement results, location information and other relevant information from the UEs.

There are two different types of MDT: immediate MDT and logged MDT. In immediate MDT cases, a UE is configured to perform measurement in Radio Resource Control (RRC) Connected state. The measurement report is sent to an eNB immediately at the time of the reporting condition. In logged MDT cases, a UE is configured to perform measurement in RRC Idle state when some configured conditions are satisfied. The UE stores measurement logs and reports to an eNB at a later point of time. In either type of the MDT, how to accurately interpret the measurements and correlate different information are important to get an accurate coverage picture.

In 3GPP Release-10, there are two measurements included in MDT for the purpose of uplink (UL) coverage and performance characterization: Power Headroom (PHR) measurement by UE, and uplink signal strength and signal-to-interference plus noise ratio (SINR) measurement by eNB. PHR can be used by the eNB to calculate the path loss of the UE, which is then used in setting for SINR target. PHR indicates how much power UE is left with to start using full power, which is the difference between the current UE transmit power and the maximum UE transmit power. There are some issues with the current art in using the UL measurements for MDT.

First, uplink measurement itself is not sufficient to build an UL performance map. Current art suggests that a low PHR value is an indicator of a UL performance problem. Such predication is not accurate and is wrong in some cases. The used power level for transmission is dynamically dependent on Modulation and Coding Scheme (MCS) and the bandwidth—the number of Physical Resource Blocks (PRBs). Therefore, for services with dynamic bit rate, a low PHR is not necessarily a sign of uplink problem. For example, if a service is using a high bit rate, the PHR may be low because the base station is aggressive in the link adaptation. A low PHR may also be a result of a base station prioritizing a certain UE by allocating a wide bandwidth to this UE. Current art also suggests that a low UL signal strength or SINR is an indicator of uplink performance problems. Such predication may also be wrong. Under current link-adaptation and power control method, receive power measurement together with interference measurement in certain circumstances can represent UL performance. However, these measurements do not tell everything about coverage problems. One type of coverage problem occurs when a UE is power limited and cannot achieve a planned minimum bit rate. Many factors can result in a low UL signal strength, such as scheduled low bit rate. Low UL signal strength can also be required in order to reduce UL interference, or to save UE battery. Base stations could also choose to schedule UEs with conservative link adaptation and low power. Therefore, low signal strength is not sufficient to indicate an uplink coverage problem.

A second issue with the UL measurement for MDT is how to correlate DL measurements, location information and UL measurements. Current art suggests that location information is useful and that DL measurements may be useful, however, there has been no analysis of how to provide and correlate these information. Collecting DL measurements, location information and UL measurements are matured art if performed separately. However, there exists discrepancy in collecting the information. DL measurements can be collected all the time since the reference transmissions are always ongoing. UL measurements, on the other hand, can only be collected when data transmission occurs. Therefore, for MDT purposes, many DL measurements and location information have no relevance for UL observations.

The present invention addresses two main issues in the current art for MDT. The first issue is how to correlate UL measurement data with QoS information to find UE performance problems. The second issue is how to better schedule and correlate DL measurement, location information, and UL measurement to improve MDT measurement and logging efficiency.

SUMMARY

Methods of MDT information logging and reporting are provided. In one embodiment, a method is provided to resolve shortcomings of prior art by correlating UL measurements with QoS information to enable UL performance analysis and accurate detection of coverage problems. In another embodiment, a method is provided to resolve the shortcomings of the prior art by making DL measurements and location information collecting or logging conditional on UL measurements.

Embodiments of the present invention provide a method to correlate UL measurement with relevant QoS information, the method including: transmitting uplink data from a user device (UE) to a network device over a wireless uplink channel; measuring transmission power of the uplink channel and thereby generating transmission power information; obtaining transmission Quality of Service (QoS) information of the uplink channel; and correlating the transmission power information with the transmission QoS information and thereby determining uplink performance of the UE.

In other embodiments of the present invention, a method is provided including: receiving, by a network device, uplink data from a user device (UE) over an uplink channel in a wireless network; receiving transmission power information from the UE; obtaining transmission Quality of Service (QoS) information; and correlating the transmission power information with the transmission QoS information and thereby determining uplink performance of the UE.

In other embodiments of the present invention, a method to correlate DL measurement and location information with UL measurement is provided, the method including: performing a location-related measurement and thereby generating a location measurement result by a user equipment (UE) in a wireless network; performing a downlink measurement and thereby generating a downlink measurement result by the UE; obtaining an uplink measurement result; and correlating the location-related measurement result and the downlink measurement result with the uplink measurement result.

In other embodiments of the present invention, a method is provided including: receiving, by a network device, a location-related measurement result from a user equipment (UE) in a wireless network; receiving a downlink measurement result from the UE; obtaining an uplink measurement and thereby generating an uplink measurement result; and correlating the location-related measurement result and the downlink measurement result with the uplink measurement result.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
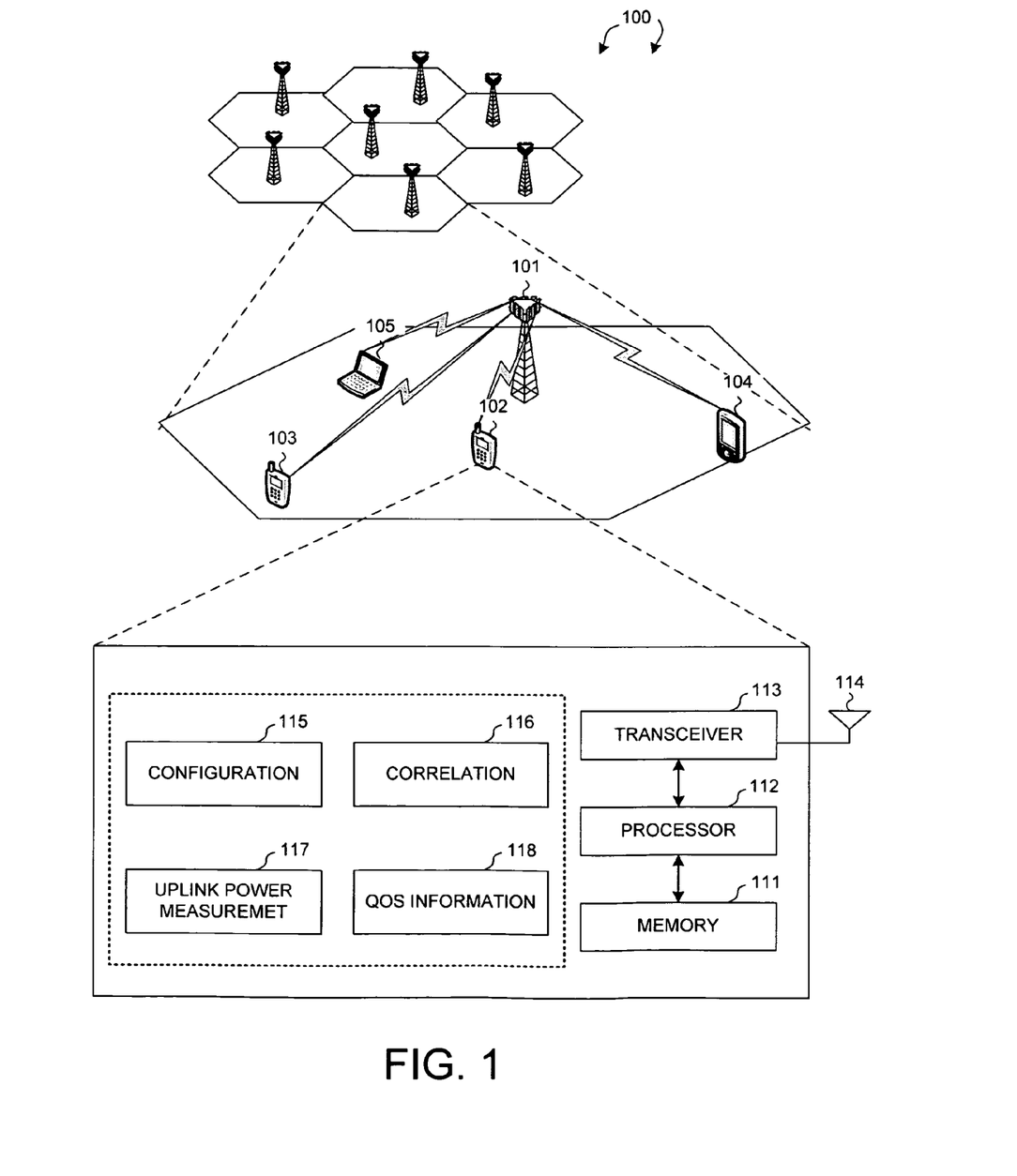
FIG. 1 schematically shows a wireless communication system where multiple UEs with different QoS requirements with an eNB, and a block diagram of a UE in accordance with a novel aspect.

FIG. 1 schematically shows a wireless communication system 100 where multiple UEs with different QoS requirements communicate with an eNB, and a block diagram of a UE where current invention applies. As shown in FIG. 1, multiple UEs 102-105 are connected with eNB 101. The UEs are at different locations of the cell, and thus, some may have coverage problems.

The UL power information is relevant to understand the character of a coverage problem. For example, if UE 103, which is at the edge of the cell, is using all its power and still cannot achieve planned performance, there is a cell-edge-performance problem related to coverage. The coverage or radio layer or RF problems that are normally related to Signal to Noise Ratio (SNR) or SINR, can be resolved by changing antennas, power amplifiers, filters, etc. In a cellular system, changes to radio layer usually affect the behavior and performance of the whole cell that is visible to all layers of the communication. One solution to improve the radio layer problem might be to increase the receiving sensitivity in a particular direction by changing the direction of serving cell antennas. Such changes, however, may create coverage holes that are hard to detect and have high impact on UE connectivity. Therefore, relevant factors need to be considered together with UL measurement in MDT to make such high impact coverage adjustments.

On the other hand, for example, if UE 105, which is in an area that has no coverage problem, cannot achieve its planned performance while not using all its power, the problem may be Radio Resource Manager (RRM) related rather than coverage related. In such cases, it is possible for Radio Access Node (RAN) to change the character of radio transmission, such as characteristics of inter-cell load balancing. Normally, if RRM decisions go wrong, a UE still has an option to make another attempt and stay in service. For example, if RAN aggressively steers a UE in inter-cell load balancing, the UE may lose connection to its serving cell. However, the UE may still recover a connection with another more suitable cell. UL power is balanced between neighboring cells at cell edge to have a stable interference environment and a maximum UL bit rate performance while minimizing UE output power and battery impact. Therefore, inter-cell load balancing and other RRM algorithms should also be factors related to UL measurement for network coverage optimization.

Further, as shown in FIG. 1, other parameters may also affect the power level of a UE. For example, UE 103, a cell phone engaged in an audio conversation, has different QoS requirement from UE 105, which is a laptop using burst data services. A UE can use high power to achieve higher QoS, such as high bit rate, low latency. For example, UE power control is designed in such a way that a UE uses more power when it transmits with more bits. Such UE transmission can be accommodated by using broader radio bandwidth, additional antenna multiple input multiple output (MIMO) technology, or more aggressive modulation or coding scheme (MCS). Similarly, a UE is expected to allocate more power for transmission to reduce latency because higher transmission will reduce the need for retransmission, which is a main source of introducing latency. The QoS parameters may be deduced from link adaptation parameters and measurements such as adopted MCS, used MIMO mode, used frequency bandwidth, number of soft-combined transmissions needed by hybrid automatic repeat request (HARQ) or by macro-diversity. Therefore, the UL power level is not totally determined by the location or coverage area where a particular UE is located. Thus, UL power information alone is not enough to locate a coverage problem. Additional QoS parameters are needed to correlate with the UL measurement in MDT to create a better understanding of any coverage problems.

An exemplary block diagram of UE 102 that carries out embodiments of the present invention is shown in FIG. 1. Antenna 114 transmits and receives RF signals. Transceiver module 113, coupled with antenna 114, receives RF signals from antenna 114, converts them to baseband signals and sends them to processor 112. Transceiver 113 also converts received baseband signals from the processor 112, converts them to RF signals, and sends out to antenna 114. Processor 112 processes the received baseband signals and invokes different functional modules to perform features in UE 102. Memory 111 stores program instructions and data to control the operations of UE 102.

FIG. 1 also shows functional blocks 115, 116, 117 and 118, which carry out embodiments of the present invention. Configuration Module 115 processes configuration information from the network and interacts with other functional modules, such as correlation module 116, to carry out actions accordingly. Correlation Module 116 employs algorithm to correlate the resulting measurement data and QoS information to generate a more complete report. In one embodiment of the present invention, Correlation Module 116 may also take configuration data from Configuration Module 115 or other embedded instructions to carry the correlation algorithm. Uplink Power Measurement Module 117 measures the uplink power and generates relevant uplink power information. In one embodiment of the present invention, Power Measurement Module 117 may also take into account configuration information or other embedded instructions and can adapt to generate relevant power information accordingly. QoS Information Module 118 obtains and processes relevant QoS information so that Correlation Module 116 can effectively correlates the measurement data with QoS information. In one embodiment of the present invention, QoS Information Module 118 may be adapted to take configuration data and dynamically changes QoS information.

Figure 2A:
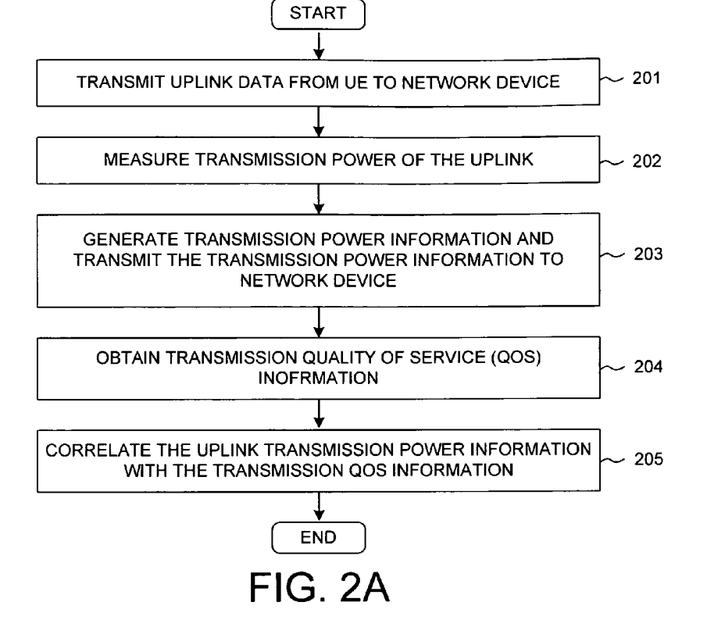
FIG. 2A shows a method steps diagram of one embodiment of the present invention where Quality of Services (QoS) information is correlated with UL measurement.

FIG. 2A shows a method steps diagram of some embodiments of the present invention where Quality of Services (QoS) information is correlated with UL measurement. At Step 201, a UE transmits uplink data to a network device. The UL transmission happens when a UL grant is received. Either of these steps may be a trigger for a MDT uplink measurement procedure. At Step 202, the UE would measure the transmission power of the active uplink channel. At Step 203, the UE generates transmission power information and transmits the transmission power information to a network device.

Several types of transmission power information can be considered. If the transmission power information logging is done in the UE, then the absolute transmit power level may be used because the UE always knows its absolute power used at a transmission and this would be the most useful metric to estimate UL performance. Another way is to use PHR. The advantage of using PHR is to maximize reuse and minimize standards impact. It can also minimize additional testing required. PHR can be used either in the UE, or reported to the network and logged by the network. Upon decoding PHR, an estimated absolute transmission power can be deduced. Yet in some other cases, a Boolean indicator of whether the UE is power-limited or not is sufficient transmission power information. For example, when the logging needs to be limited to "real" observed data (no extrapolation calculations to estimate what could be achieved at other power levels than the used one), a Boolean indicator would be enough for power information. Another example is in cases when power limited scenario is the main interest, such as when UE is asked to transmit at maximum data rate at current radio conditions. In some cases, implicit power information is deduced based on power control command or defined UE power control behavior. For example, there may be limitations in PHR reporting when RAN may not receive a PHR for every received transmission. In such scenarios, RAN will do power control for each transmission, tracking and estimating the used UE power in between received PHRs. Such estimation may not be perfectly accurate, but the implicitly deduced information can still be of value for MDT purposes.

At Step 204, the UE obtains transmission quality of service (QoS) information. In one embodiment of the present invention, data rate is one of the QoS information that can be used to correlate with the UL measurement. If knowing the scheduled physical layer (L1) data rate and the UE power, accurate power used by the UE can be deduced. For example, we assume that the scheduled physical layer data rate is the number of bits allocated to be transmitted across a time transmission interval (TTI), divided by the length of the TTI. If UE is using all its power, or almost all its power, it can be reasonable concluded that the scheduled physical layer bit rate is close to the maximum limit that could be achieved in the specific geographical location with the current radio layer setting. However, if the UE is not using all its power, information of UE's remaining power and the scheduled L1 data rate could be used to estimate the maximum limit bit rate extrapolation. Therefore, the QoS information of data rate, together with UL measurement and location information would be useful to accurately find locations where planned bit rate cannot be achieved. The data rate can be either guaranteed bit rate (GBR) or prioritized bit rate (PBR), or bit rate calculated as transport block size or transmission time.

Similarly, transport block size would also be useful QoS information for MDT report. If the TTI length is known, then the scheduled physical layer data rate can be easily calculated by knowing the transport block size. Therefore, instead of data rate, transport block sized could also be logged and used the same way as data rate to deduce accurate coverage information by combining it with UL measurement and location information. Moreover, using transport block size has advantage for its simplicity because the detailed definition of a data rate measurement does not need to be considered.

In one embodiment of the present invention, if MCS and the transmission bandwidth (BW) are known for a certain radio access technology (RAT), it would be possible to deduce the transport block size for the transmission. For CDMA systems, an equivalent would be a spreading factor. Thus, according to the above analysis, if these parameters are logged and reported, they can be used as data rate to achieve the same results as logging data rate. An advantage of logging MCS and BW separately is that they have different characteristics from power usage and transmission robustness point of view. Therefore, if they are provided separately, the combination will give better insights into the detail operation of the RRM and better clues for how to optimize RRM algorithm. Furthermore, if RRM algorithm operation is known and predictable, MCS information is also useful to provide information on achievable bit rate in certain locations.

In another embodiment of the present invention, QoS information of number of soft combinations by HARQ or macro diversity is used for MDT purposes. In some cases, a certain transmission may fail and that multiple receptions may be needed in order to make the data transmission or reception successful. Thus, the number of transmission would both reflect latency and radio-resource-usage setting limits for the actual multi-transmit data rates. Such information provides insights to RRM algorithm operation that controls the trade-off between latency, power usage and latency. Logging and reporting these data in MDT would give good estimation on RRM and QoS optimization.

In yet other embodiments of the present invention, received power or signal strength or received interference are QoS information that can be logged in MDT. If received power or signal strength could be known together with the transmission power, it would be easy to calculate the radio propagation conditions. Furthermore, if the received interference could also be known, the main physical factors limiting QoS would be known. The deduced information makes it easy to determine the needs to re-plan or change network coverage settings.

At Step 205, after obtaining the transmit power information at Step 203, and the QoS information at Step 204, the above information are correlated. The correlation can be done at the UE or at the network. Doing the logging and correlation in the UE has several advantages. The UE can obtain accurate transmission power information for every piece of data transmitted without incurring additional overhead to signal the information. UE also has access to most of the QoS information discussed in the present invention, such as data rate, transport block size, MCS, transmission bandwidth, number of resource blocks and number of soft combinations by HARQ. Logging and correlating at the network also has some advantages. It can take advantage of the network-only measurements that measures physical phenomena limits to QoS, such as received signal strength and received interference level, can be used for correlation.

Figure 2B:
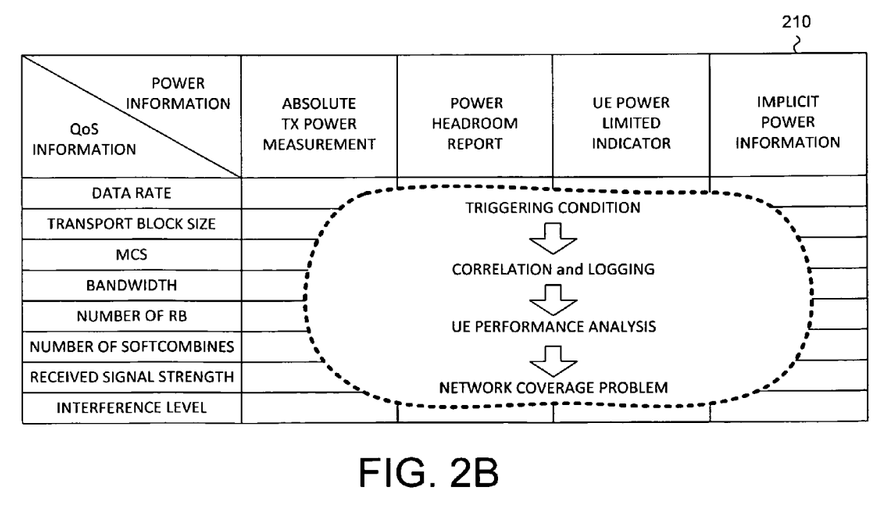
FIG. 2B is a table that lists different QoS information parameters and different UL measurements to be correlated for MDT purposes.

FIG. 2B is a table 210 that lists different transmission QoS information parameters and different transmission power information parameters to be correlated for MDT logging and reporting purposes. As illustrated in FIG. 2B, the correlation process may be triggered by a condition that corresponds to a network performance problem. In many cases, the goal of logging is to find areas where UL coverage is weaker than planned and where it may be difficult to support certain services. For such cases, it would be sufficient to only do correlation and logging when a problem condition has been detected to avoid unnecessary large logging data volumes.

In one embodiment, the problem condition represents a low data rate while the UE is power limited. Examples of such condition include data rate smaller than a minimum data rate, and PHR is smaller than a first threshold or transmission power is greater than a second threshold. When PHR is smaller than the first threshold or the transmission power is greater than the second threshold, it means that the UE is power limited or almost power limited and therefore, it is transmitting at or close to its peak data rate. If at the same time the observed data rate is smaller than a planned minimum data rate, then there is a problem with network coverage or interference or both. Such area would be a problem area subject to optimization activities.

Another example of the problem condition is transport block size is smaller than a minimum transport block size, and PHR is smaller than a first threshold or transmission power is greater than a second threshold. Similarly, instead of observing the data rate directly, small transport block size can be directly translated into small data rate. It is therefore, a sign of network coverage problem.

In yet another example, the triggering condition can be MCS smaller than a minimum MCS threshold, and PHR is smaller than a first threshold or the transmission power is greater than a second threshold. Assuming a certain predictable selection of transmission bandwidth, a certain MCS would map to a certain possible range of bit rates. Therefore, assuming a certain bandwidth allocation algorithm, if MCS is below what is needed to support a planned bit rate, it might be a clear sign of problem as observing data rate or TB size.

Figure 3:
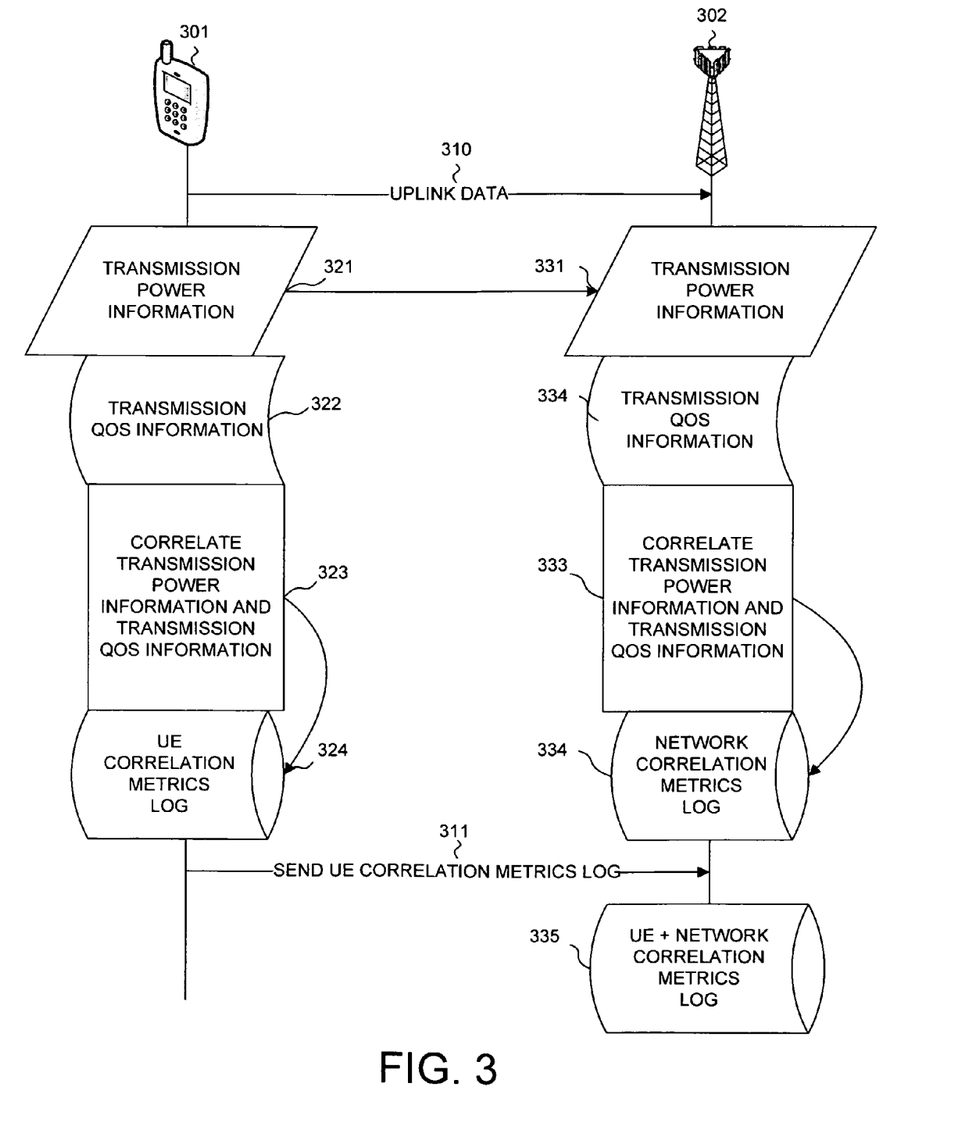
FIG. 3 shows a flow chart of one embodiment of the present invention where a UE MDT report and a network MDT report is combined.

FIG. 3 shows a flow chart of one embodiment of the present invention where a UE MDT report and a network MDT report is combined. UE 301 is connected with eNB 302. At Step 310, UE 301 sends uplink data to eNB 302. UE 301 at Step 321 measures the uplink transmission power. UE 301 then generates and logs transmission power information. At Step 331, eNB 302 obtains uplink the transmission power information (e.g., transmitted from UE 301), and logs the transmission power information. At Step 322, UE 301 obtains transmission QoS information (e.g., data rate), and logs the information. At Step 332, eNB 302 also obtains QoS information (e.g., received signal strength and interference information) and logs the information. At Step 323, UE 301 correlates the transmission power information and its QoS information. At Step 333, eNB 302 also correlates the uplink transmission power information with its QoS information. The UE correlation results are logged in a UE correlation metrics at Step 324, while the eNB correlation results are logged in a network correlation metrics log at Step 334. At step 311, UE 301 sends the UE correlation metrics log to eNB 302. At Step 335, eNB 302 combines the received UE correlation metrics log with the network correlation metrics log.

Figure 4:
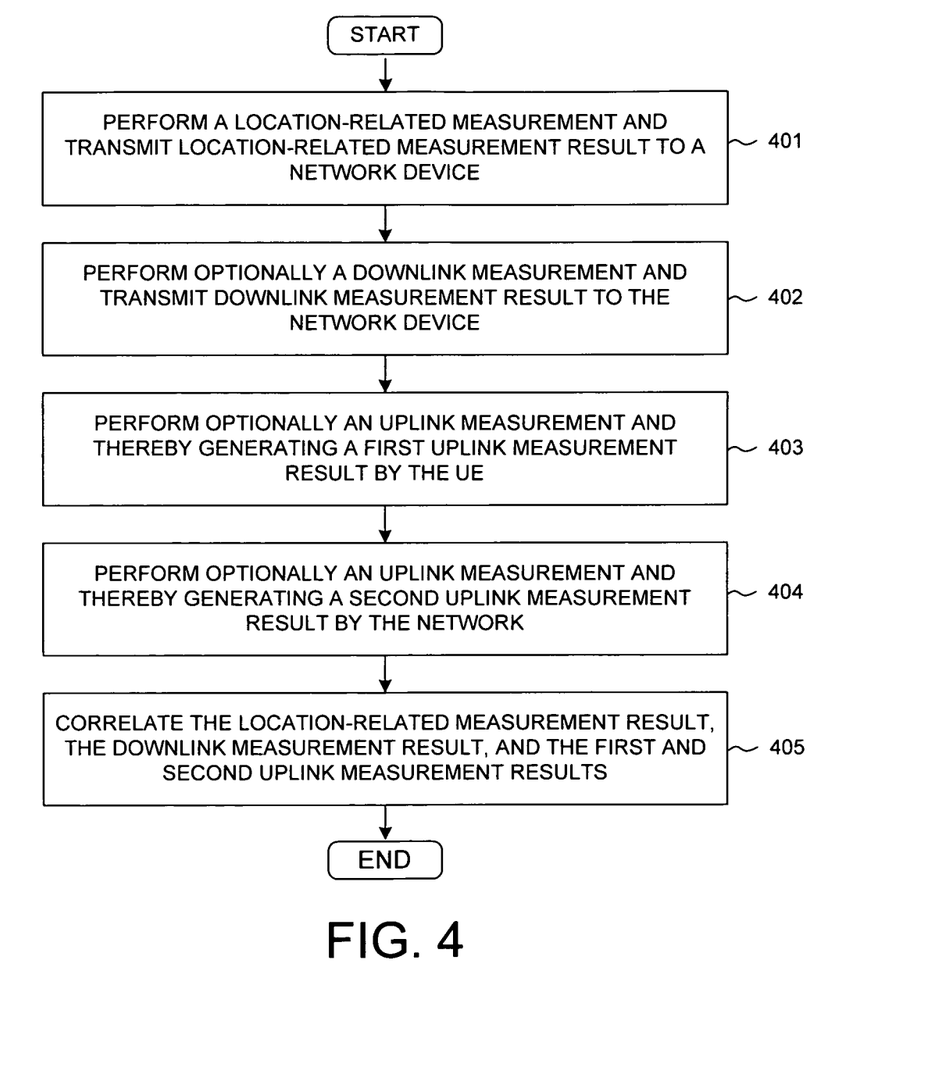
FIG. 4 shows a method steps diagram of one embodiment of the present invention where DL measurement, location information and UL measurement in the MDT are correlated.

To resolve the prior art problems of generating significant amounts of DL measurements and location measurements that are non-relevant for the uplink, it is proposed to directly or indirectly make the DL measurements and location measurements conditional on the availability of UL measurement results. FIG. 4 shows a method steps diagram of one embodiment of the present invention where DL measurement, location information and UL measurement in MDT logging and reporting are correlated. At Step 401, a UE performs a location related measurement and transmit a location-related measurement result to a network device. At Step 402, the UE performs optionally a downlink measurement and transmit a downlink measurement result to the network device. At Step 403, upon the triggering event of the UE's uplink data transmission, the UE performs optionally an uplink measurement and generates a first uplink measurement result. At step 404, the network performs optionally an uplink measurement and generates a second uplink measurement result. At Step 405, the location-related measurement result, the downlink measurement result, and the first and the second uplink measurement results are correlated by the UE or by the network device.

In one embodiment of the present invention, from UE perspective, the collecting and logging of location-related information and DL measurement result are triggered by uplink data transmission. In other words, when an UL measurement (e.g., PHR) becomes available, DL measurements and location measurements are performed, and/or available DL measurements and available location measurements are logged. This solves the problem that there is excessive DL measurement result or location information or both while there is no relevant UL measurement result. Similarly, from the network perspective, the same method can be used by the network. The receiving of the uplink data triggers the network to obtain additional UL measurement result (e.g., UL QoS), and to correlate the additional UL measurement result with DL measurement result and location-related information.

Figure 5:
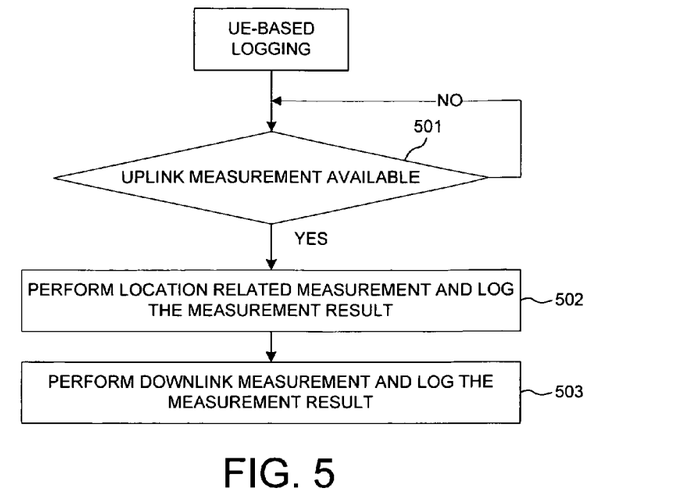
FIG. 5 shows a flow chart of an UE-based logging method where DL measurements and location measurement are triggered by an UL measurement result.

FIG. 5 shows a flow chart of an UE-based logging method where DL measurements and location measurement are triggered by the availability of an UL measurement result. At Step 501, UE monitors whether uplink measurement is available. If not available, the UE keeps on monitoring the condition. If there is an uplink measurement available, at Step 502, the UE starts the process of logging location-related measurement for MDT. At Step 503, the UE starts the process of logging downlink measurements. For UE-based logging method, applying the direct condition is the simplest way, where the availability of the UL measurements triggers the logging of DL measurements and location measurements. The same basic ideas can be applied in general for measurements that require data transmission such as the said UL measurements. In one embodiment of this invention, they apply also for data transmission dependent DL measurements, meaning that obtaining measurement that shall be correlated such as location measurements, is conditional on availability of the data transmission dependent measurement or conditional on the data transmission itself.

Figure 6A:
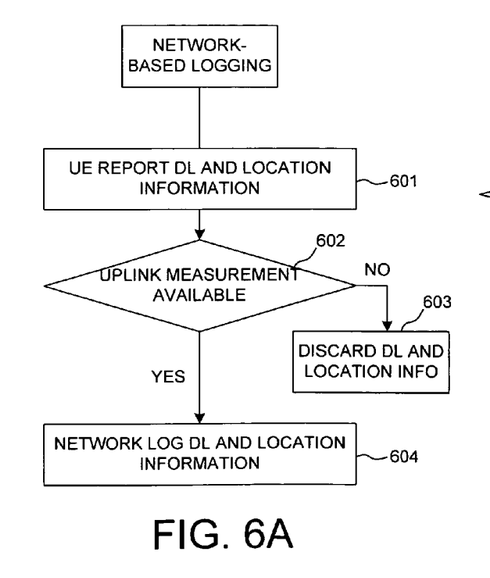
FIGS. 6A and 6B show flow charts of network-based logging methods in accordance with one novel aspect.
Figure 6B:
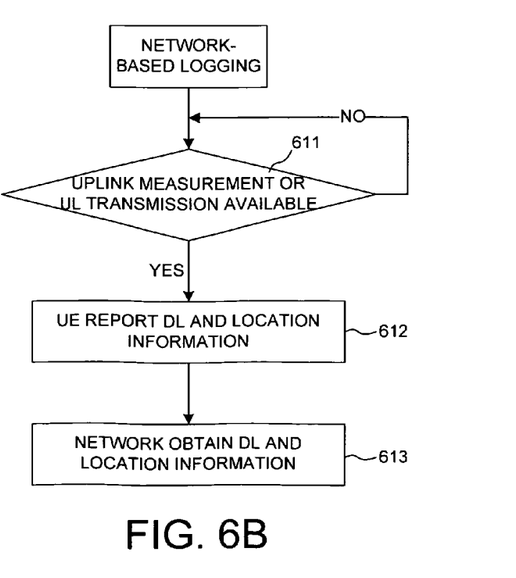

FIGS. 6A and 6B show flow charts of network-based logging methods in accordance with one novel aspect. For network-based logging, it is expected that both reported UE measurements and network measurements could be logged. In general, DL measurements and location measurements are reported by the UE. On the other hand, some of the UL measurements (e.g., PHR) are reported by UE, while some other UL measurements (e.g., UL QoS measurements) are performed by the network. FIG. 6A illustrates a filtering approach of a network-based logging method. The UE reports all DL and location information to the network (step 601), and the network filters the DL and location information when writing to a log (step 604). For example, when UL is under test, if no uplink measurement is available (step 602), then DL and location information that are not relevant for UL is discarded in the logging process (step 603). On the other hand, when UL measurement becomes available, then the network logs the relevant DL and location information in step 604. The UE may facilitate the correlation by reporting its location to the network when UL measurement becomes available. The main benefit of this filtering approach is simplicity.

In another approach, the network makes the UE to do real time reporting for DL measurements and location information conditional on the UL. Such approach further reduces the reporting overhead over the air interface. FIG. 6B illustrates this approach. In step 611, the UE monitors the availability of the uplink measurement. If UL measurement is available, the UE reports DL and location information to the network in step 612. The UE may facilitate the correlation by reporting its location to the network when UL measurement becomes available. The network logs the reported DL and location information in step 613. Such approach would really minimize the non-relevant measurement report to zero. The drawback would be that there could be eNB UL measurements that the UE does not know about. Alternatively, in step 611, the UE checks if there is uplink data transmission available, or if there is data exists in the UL transmit buffers. If uplink data transmission is available, the UE logs and reports DL and location information to the network in step 612 and the network logs the reported DL and location information in step 613. Such approach would risk crating a few non-relevant measurement reports, but it would allow eNB UL measurements to be considered and would still remove the main part of the non-relevant measurement report (i.e., assume that UL traffic may be active only for a small fraction of time).

UL measurement is important information in MDT to analyze UE performance and detect network coverage problem for network planning and optimization. To resolve the shortcomings of prior art, correlation of UL transmit power information and QoS information are designed to enable adequate and non-ambiguous observation interpretations for the UL so as to give more accurate picture of the coverage condition. Furthermore, to reduce the excessive non-relevant DL measurement and location information, the collecting and logging of DL measurement and location information is triggered by UL event.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    transmitting uplink data from a user device (UE) to a network device over a wireless uplink channel;
    measuring transmission power of the uplink channel and thereby generating transmission power information;
    obtaining transmission Quality of Service (QoS) information of the uplink channel;
    correlating the transmission power information with the transmission QoS information and generating a correlation result of UE's UL performance; and
    identifying a performance problem of the UE for Minimization of Drive Test (MDT) based on the correlation result.

2. The method of claim 1, wherein the transmission QoS information comprises at least one of a data rate, a transport block size, a modulation and coding scheme, a transmission bandwidth, a number of resource blocks, a number of soft combinations or network macro diversity, a signal strength or quality, and an interference level.

3. The method of claim 1, wherein the transmission power information comprises at least one of an absolute transmission power measured, a power headroom report, an indicator indicating that the UE is power limited, and implicit power information deduced based on a power control command or a defined UE power control behavior.

4. The method of claim 1, wherein the UE archives the correlation result of the transmission power information and the transmission QoS information in a UE metrics log.

5. The method of claim 4, further comprising:
    reporting the UE metrics log to the network device.

6. The method of claim 4, wherein the archiving into the log is conditional based on a condition corresponding to a network performance problem.

7. The method of claim 6, wherein the condition being a low data rate and the UE is power limited.

8. A method, comprising:
    receiving, by a network device, uplink data from a user device (UE) over an uplink channel in a wireless network;
    receiving transmission power information from the UE;
    obtaining transmission Quality of Service (QoS) information;
    correlating the transmission power information with the transmission QoS information and generating a correlation result of UE's UL performance; and
    identifying a performance problem of the UE for Minimization of Drive Test (MDT) based on the correlation result.

9. The method of claim 8, wherein the transmission QoS information comprises at least one of a data rate, a transport block size, a modulation and coding scheme, a transmission bandwidth, a number of resource blocks, a number of soft combinations or network macro diversity, a signal strength or quality, and an interference level.

10. The method of claim 8, wherein the transmission power information comprises at least one of an absolute transmission power measured, a power headroom report, an indicator indicating that the UE is power limited, and implicit power information deduced based on a power control command or a defined UE power control behavior.

11. The method of claim 8, wherein the network device archives the correlation result of the transmission power information and the transmission QoS information in a network metrics log.

12. The method of claim 11, further comprising:
receiving a UE correlation metrics log that comprises another correlation result of the transmission power information and the transmission QoS information generated by the UE.

13. The method of claim 12, wherein the network metrics log further includes the UE correlation metrics log.

14. A user equipment (UE), comprising:
a transceiver that transmits uplink data to a network device over a wireless uplink channel;
an uplink power measurement module that measures transmission power of the uplink channel and thereby generating transmission power information;
a Quality of Service (QoS) module that obtains QoS information of the uplink channel; and
a correlation module that correlates the transmission power information and the transmission QoS information, generates a correlation result of the UE's UL performance, and identifies a performance problem of the UE for Minimization of Drive Test (MDT) based on the correlation result.

15. The UE of claim 14, wherein the transmission QoS information comprises at least one of a data rate, a transport block size, a modulation and coding scheme, a transmission bandwidth, a number of resource blocks, a number of soft combinations or network macro diversity, a signal strength or quality, and an interference level.

16. The UE of claim 14, wherein the transmission power information comprises at least one of an absolute transmission power measured, a power headroom report, an indicator indicating that the UE is power limited, and implicit power information deduced based on a power control command or a defined UE power control behavior.

17. The UE of claim 14, further comprising:
a memory that stores the correlation result of the transmission power information and the transmission QoS information in a UE metrics log.

18. The UE of claim 17, wherein the transceiver reports the UE metrics log to the network device.

19. The UE of claim 17, wherein the storing into the log is conditional based on a condition corresponding to a network performance problem.

20. The UE of claim 19, wherein the condition being a low data rate and the UE is power limited.

21. The UE of claim 14, further comprising:
a configuration module, wherein the configuration module configures a correlation algorithm for the correlation module.

* * * * *